(12) United States Patent
Kirkland et al.

(10) Patent No.: US 7,970,501 B2
(45) Date of Patent: Jun. 28, 2011

(54) METHODS AND SYSTEMS UTILIZING TRUE AIRSPEED TO IMPROVE VERTICAL VELOCITY ACCURACY

(75) Inventors: Jeffrey W. Kirkland, Redington Beach, FL (US); John F. Anderson, Oldsmar, FL (US)

(73) Assignee: Honeywell International Inc., Morristown, NJ (US)

(*) Notice: Subject to any disclaimer, the term of this patent is extended or adjusted under 35 U.S.C. 154(b) by 456 days.

(21) Appl. No.: 11/075,171

(22) Filed: Mar. 8, 2005

(65) Prior Publication Data

US 2006/0206267 A1    Sep. 14, 2006

(51) Int. Cl.
*G05D 1/08* (2006.01)
*G01C 23/00* (2006.01)

(52) U.S. Cl. ......... 701/7; 701/3; 701/4; 701/8; 701/220; 340/969; 340/970; 340/977; 340/978; 73/178 R

(58) Field of Classification Search ............. 701/3, 4, 701/7, 8, 220; 340/969, 970, 977, 978; 73/178
See application file for complete search history.

(56) References Cited

U.S. PATENT DOCUMENTS

| | | | |
|---|---|---|---|
| 4,012,626 A | | 3/1977 | Miller et al. |
| 4,070,674 A | | 1/1978 | Buell et al. |
| 4,106,094 A | * | 8/1978 | Land .............................. 701/220 |
| 4,382,283 A | * | 5/1983 | Clelford et al. ................. 701/11 |
| 4,853,861 A | * | 8/1989 | Ford et al. ....................... 701/14 |
| 4,882,697 A | | 11/1989 | Ross |
| 5,109,230 A | | 4/1992 | Hassenpflug |
| 5,214,596 A | * | 5/1993 | Muller .......................... 702/144 |
| 5,339,684 A | | 8/1994 | Jircitano et al. |
| 5,349,347 A | | 9/1994 | Muller |
| 5,359,889 A | | 11/1994 | Jircitano et al. |
| 5,382,954 A | * | 1/1995 | Kennedy et al. ............. 340/961 |
| 5,422,817 A | * | 6/1995 | Tazartes et al. ................ 702/93 |
| 6,324,448 B1 | | 11/2001 | Johnson |
| 6,430,479 B1 | | 8/2002 | Johnson |
| 6,785,594 B1 | * | 8/2004 | Bateman et al. .................. 701/9 |
| 6,947,814 B2 | * | 9/2005 | Giraudy et al. ................... 701/5 |
| 6,961,643 B1 | * | 11/2005 | Younkin et al. ................... 701/7 |

OTHER PUBLICATIONS

International Searching Authority, The International Search Report, Sep. 26, 2006, 5 pages.

* cited by examiner

*Primary Examiner* — Jack Keith
*Assistant Examiner* — Chuong P Nguyen
(74) *Attorney, Agent, or Firm* — Fogg & Powers LLC

(57) ABSTRACT

An inertial navigation system which includes a first control system and a second control system is described. The first control system is configured to estimate a vertical velocity based in part on received vertical acceleration data. The second control system is configured to receive the estimated vertical velocity from the first control system and determine a compensated vertical velocity utilizing the estimated vertical velocity and airspeed.

15 Claims, 4 Drawing Sheets

METHODS AND SYSTEMS UTILIZING TRUE AIRSPEED TO IMPROVE VERTICAL VELOCITY ACCURACY

STATEMENT REGARDING FEDERALLY SPONSORED RESEARCH & DEVELOPMENT

The United States Government has acquired certain rights in this invention pursuant to Contract No. N00019-02-C-3002 issued by the Department of the Navy.

BACKGROUND OF THE INVENTION

This invention relates generally to an inertial navigation system (INS), and more specifically, to methods and systems which utilize a true airspeed to improve the vertical accuracy of an INS.

An inertial navigation system (INS), for example, an INS within an aircraft, provides a pilot and other systems within the aircraft with positional data. At least one known INS includes a vertical channel, which provides both a vertical velocity and a vertical position along a vertical axis. The vertical axis is defined as an axis that is perpendicular to the local level plane. Such an INS employs a triad of gyroscopes and accelerometers. These gyroscopes and accelerometers are mounted in an orthogonal manner with respect to one another, either physically or mathematically, such that a center of percussion and a center of rotation coincide as closely as possible.

The gyroscopes provide the ability to measure an angular rate to stabilize the platform (e.g., the aircraft) in inertial space, and the accelerometers provide a measurement of linear acceleration. The angular rate and acceleration information is provided to a navigation computer which, as part of the INS, provides a position, a velocity, and an attitude of the aircraft. The INS provides an independent navigation solution (e.g., the positional data) by measuring the dynamics (based on the signals received from the gyroscopes and accelerometers) of a flight from which such navigation parameters are produced.

However, the vertical channel of these inertial navigation systems are by nature unstable. This instability is caused by errors in the measurement of vertical acceleration. The vertical acceleration is measured utilizing the above described gyroscopes and accelerometers, and then integrated to provide vertical velocity, and then integrated again to provide a position. There are typically errors related to such inertial instruments, for example, manufacturing flaws, electronic noise, temperature sensitivities, and other sources of error. These errors are compounded as the navigation computer performs the calculations which result in the determination of the vertical acceleration, velocity, and position.

It is known to utilize a control circuit in conjunction with the vertical channel of the INS. The control circuit utilizes data from a barometric altimeter, which is common to many aircraft. The barometric altimeter provides an independent measurement of vertical position which can be used to constrain the position errors from the navigation computer and improve accuracy of the computed Vertical velocity. However, compensation utilizing barometric altimeter data has drawbacks, one of which is that computations originating from the barometric altimeter have a latency of several seconds.

BRIEF SUMMARY OF THE INVENTION

In one aspect, an inertial navigation system is provided that comprises a first control system and a second control system. The first control system is configured to estimate a vertical velocity based in part on received vertical acceleration data. The second control system is configured to receive the estimated vertical velocity from the first control system and further configured to compensate the estimated vertical velocity based on a vertical component of airspeed.

In another aspect, a method for determining a vertical velocity for output by an inertial navigation system is provided. The method comprises determining an estimated vertical velocity based at least partially on vertical acceleration data and compensating the vertical velocity estimate with airspeed data.

In still another aspect, a unit for compensating an estimated vertical velocity with a vertical component of airspeed is provided. The unit is configured to calculate a vertical velocity by determining a difference between the vertical component of airspeed and the estimated vertical velocity.

DETAILED DESCRIPTION OF THE INVENTION

Figure 1:
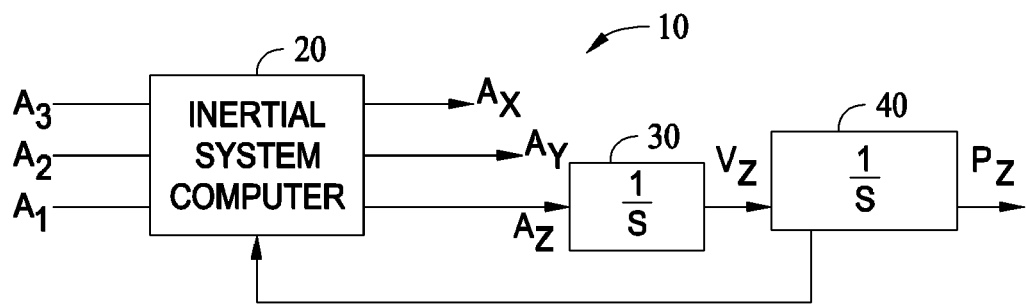
FIG. 1 is a block diagram of an inertial navigation system illustrating calculation of a vertical velocity and a vertical position.

FIG. 1 is a simplified block diagram of a inertial navigation control system 10 which includes the above described orthogonal triad of accelerometers having outputs $A_1$, $A_2$ and $A_3$ applied as inputs to an inertial navigation system computer 20. The accelerometers are orthogonally positioned relative to one another in order to provide orthogonal components of acceleration. After initialization of inertial navigation system computer 20, computer 20 is configured to calculate the orthogonal components of acceleration $A_X$, $A_Y$ and $A_Z$, where the acceleration $A_Z$, is identified as the acceleration in the vertical direction, i.e., perpendicular to the earth's surface. The vertical acceleration information is further provided to an integrator 30, which determines a vertical velocity $V_Z$, from the received vertical acceleration, $A_Z$. Because gravitation and the earth's radius are included in the calculations performed by inertial system computer 20, vertical position information from a second integrator 40 is also provided as feedback to system computer 20. Second integrator 40 receives the vertical velocity $V_Z$, and determines a vertical position of the aircraft, $P_Z$.

It should be understood that any errors or bias in the acceleration inputs $A_1$, $A_2$, and $A_3$ and the vertical position $P_Z$ that is fed back to inertial system computer 20, will particularly impact the calculated value of the vertical acceleration output $A_Z$. Any errors in $A_Z$ and $V_Z$ will ultimately affect the determination of the vertical position of the aircraft, $P_Z$, and therefore may affect flight operations of the aircraft.

Figure 2:
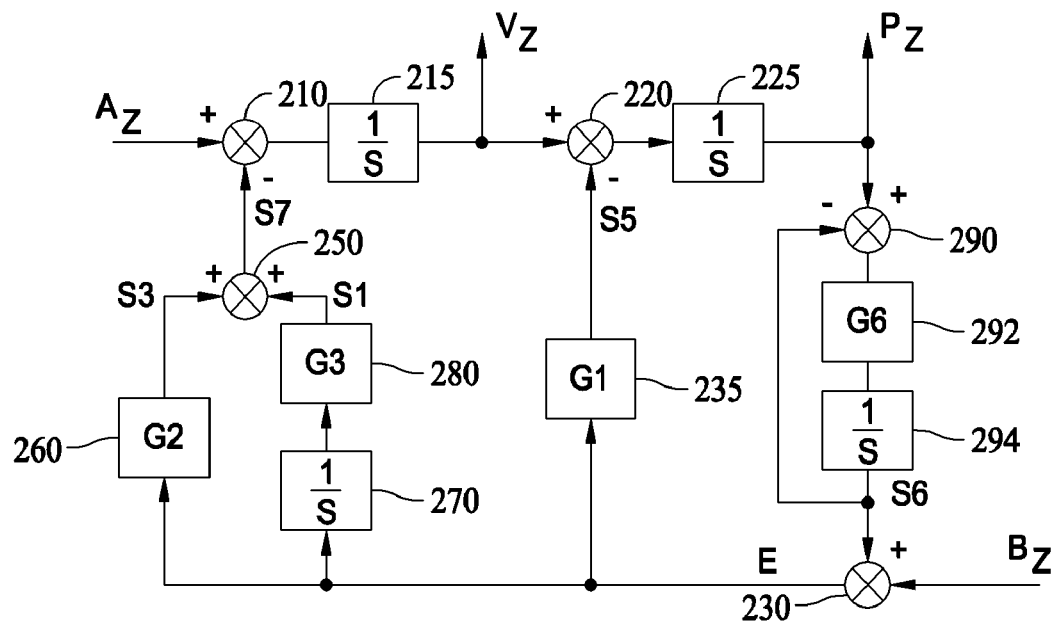
FIG. 2 is a block diagram of a known vertical channel control system for an inertial navigation system which incorporates barometric altimeter compensation of vertical velocity.

FIG. 2 is a block diagram of a known control system 200 utilized in determining the vertical component of position, $P_Z$, as a function of the inertially sensed vertical acceleration, $A_Z$, and a barometric altitude signal, $B_Z$, that is provided from a barometric altimeter (not shown). For example, a vertical component of velocity, $V_Z$, is determined as a signal difference 210 between the vertical component of acceleration, $A_Z$, and an acceleration correction signal, S7. The difference 210 is integrated 215 to provide the vertical component of velocity, $V_Z$. A vertical component of position, $P_Z$, is determined as a signal difference 220 between the vertical component of velocity, $V_Z$, and a velocity correction signal S5 which is then integrated 225. The altitude, or vertical component of position, $P_Z$, is the integration 225 of the signal difference 220.

An error signal "E" is provided as the sum 230 between the vertical component of position, $P_Z$, and the barometric altitude signal, $B_Z$. The velocity correction signal S5 described above is, in the illustrated embodiment, the error signal "E" multiplied by a fixed gain 235 of G1. The acceleration correction signal S7 described above is a sum 250 of signals S1 and S3. Signal S3 is the error signal "E" multiplied by a variable gain 260 of G2, and signal S1 is the integration 270 of the error signal E multiplied by a variable gain 280 of G3. In one embodiment, the variable gain 260 of G2 is approximately twice the gravitational force divided by the earth's radius, and the variable gain 280 of G3 is substantially equal to 1.0E-06.

Calculation of the vertical component of position, $P_Z$, using the vertical component of acceleration, $A_Z$, that has been derived from inertial sensors (e.g., accelerometers) is an inherently unstable process. The process is unstable since the vertical component of position, $P_Z$, is used by inertial system computer 20 to calculate the value of gravity. The value of gravity is taken into consideration for the determination of the vertical component of acceleration, $A_Z$, of inertial system computer 20 (shown in FIG. 1). In effect, this is positive feedback around a loop from $P_Z$ to $A_Z$ and back through the two integrators 215 and 225. This feedback is comparatively small in value, approximately two times the value of gravity divided by the earth's radius. However, even though the feedback is small, the positive feedback loop does diverge, causing unacceptably large errors after several minutes if undamped.

In the embodiment illustrated in FIG. 2, the vertical component of barometric altitude, $B_Z$, is utilized to provide damping. Velocity correction single S5 provides proportional feedback dependent upon the error signal E. Acceleration correction signal S7 also provides integral plus proportional feedback, S1 and S3 respectably, that is also dependent upon the error signal E. The purpose of the S1 and S3 feedback signals is to zero out any offset error in the vertical component of acceleration, $A_Z$. The combination of correction signals S5 and S7 provide control loop stability.

Control system 200 further includes a time delay circuit feeding back the vertical component of position output, $P_Z$, to summer 230. The time delay circuit includes a summing unit 290, a gain block 292 having a gain of G6, and an integrator 294 having an output signal S6 which is applied to summer 230 and also negatively fed back into summing unit 290. Summing unit 290 determines a difference function between the vertical altitude, $P_Z$, and the output of integrator 294.

Gain blocks 235, 260, 280 and 292 are configured as variable gain blocks. Variable gains associated with one embodiment of each of gain blocks 235, 260, 280, and 292 are described in more detail in U.S. Pat. No. 4,882,697 entitled "Stabilization Control Circuit For Vertical Position in an Inertial Navigator" which issued to Ross, the entire subject matter of which is hereby incorporated by reference in its entirety.

Control system 200 is sometimes referred to as a barometric altimeter (baro-altimeter) aided loop. However, while control system 200 provides some control loop stability to calculation of vertical velocities, the baro-altimeter aided control loop of control system 200 also includes initialization and response limitations. For example, integration and transfer functions within control system 200 have an extended stabilization time. Therefore, control system 200 does not respond well to flight dynamics over short time periods. In addition, a vertical velocity that is calculated by control system 200 may include inaccuracies during high rates of climb, as illustrated in FIG. 3.

Figure 3:
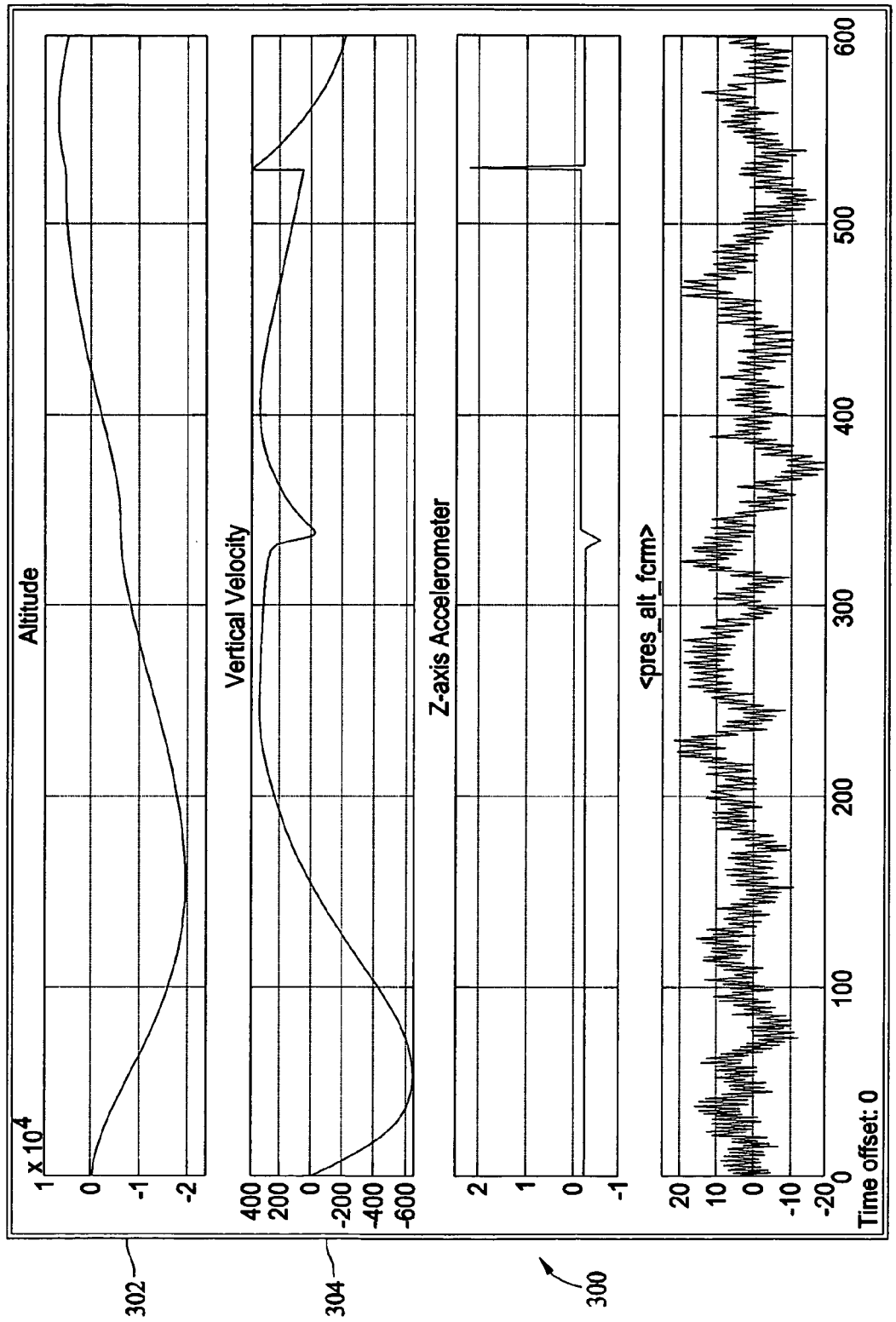
FIG. 3 is a graph illustrating vertical velocity response time for changes in altitude for the control system of FIG. 2.

FIG. 3 is a graph 300 illustrating changes in altitude over a period of time. In addition to an altitude output 302, a vertical velocity output 304 is provided for the same time period, as calculated by control system 200 (shown in FIG. 2). As is illustrated in graph 300, the vertical velocity output 304 is slow to respond to changes (or a sudden lack of change) in altitude.

Figure 4:
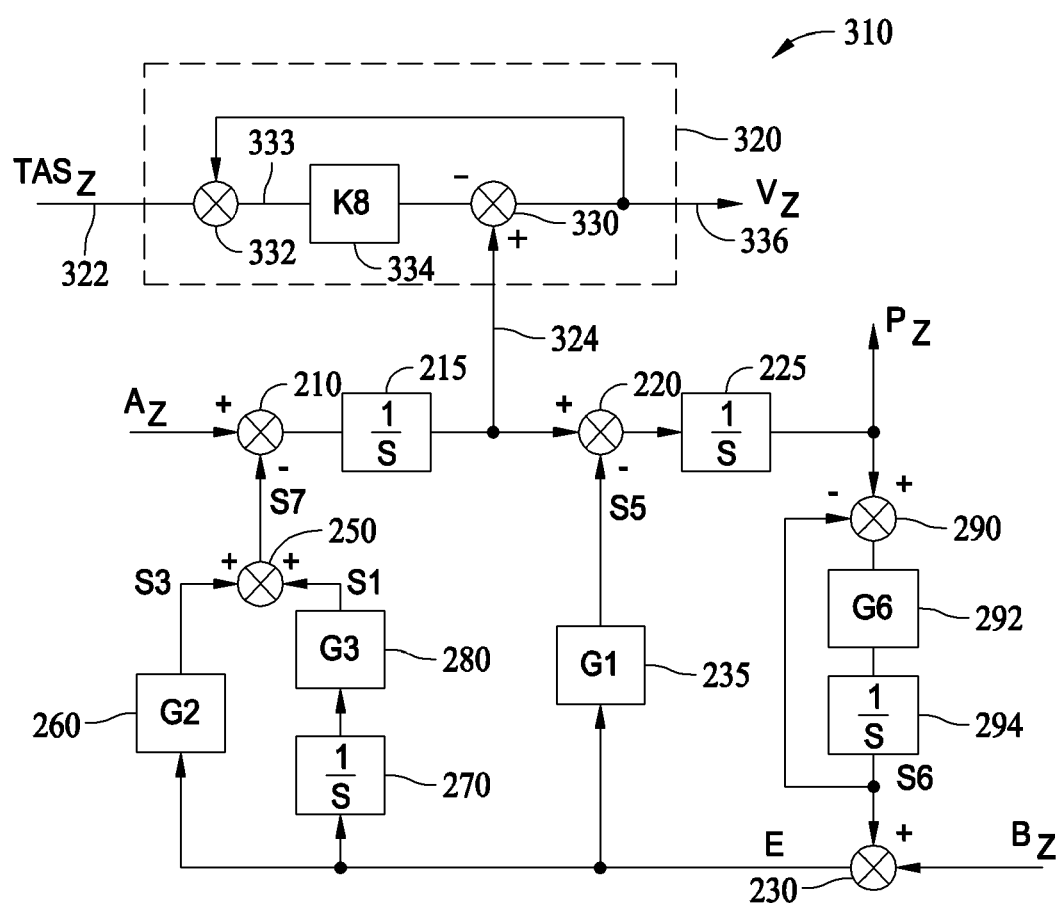
FIG. 4 is a block diagram of a vertical channel control system for an inertial navigation system which incorporates barometric altimeter compensation along with utilization of a vertical component of true airspeed to compensate a vertical velocity.

FIG. 4 illustrates a control system 310 which provides additional stability in the calculation of a vertical component of velocity, $V_Z$. Components of control system 310 which are functionally equivalent to components of control system 200 (shown in FIG. 2) are illustrated utilizing the same reference numerals. In addition to utilization of the vertical component of barometric altitude, $B_Z$, as described with respect to control system 200, system 310 is configured to augment a vertical control loop with true airspeed as received from a true airspeed (TAS) device, for example, an airspeed indicator, which is common to many aircraft.

The true airspeed device provides a measurement of the speed and direction of the aircraft body through the air mass. True airspeed devices are complex devices which use temperature, altitude, air density, and other parameters to provide the magnitude of velocity, angle of attack, and angle of slideslip for an aircraft. The true airspeed is adjusted for attack and slideslip angles and then, using aircraft attitude information of roll and pitch, solves for the vertical component of the airspeed. This quantity is then used to form an error which, as described below, is utilized in the calculation of the vertical component of velocity, $V_Z$.

More specifically, and referring again to FIG. 4, control system 310, sometimes referred to as a true airspeed baro-aided altimeter loop, includes a true airspeed compensation unit 320 receiving a vertical component of true airspeed ($TAS_Z$) 322 and an estimated vertical velocity 324. True airspeed compensation unit 320 provides an additional control system which utilizes $TAS_Z$ 322 to correct errors in the estimated vertical velocity 324. The error is corrected by determining a difference between the vertical component of true airspeed $TAS_Z$ 322 and the estimated vertical velocity 324. In the embodiment illustrated, estimated vertical velocity 324 is received by a velocity summing unit 330. The vertical component of true airspeed $TAS_Z$ 322 is received by a feedback summing unit 332, which provides an output error signal 333 to a gain unit 334. The output of gain unit 334 is summed with estimated vertical velocity 324 providing a compensated vertical velocity $V_Z$ 336. The compensated vertical velocity 336 is fed back to feedback summing unit 332 where it is summed with $TAS_Z$ 322 resulting in an error signal 333.

During dives and climbs, the vertical component of the barometric altitude signal, $B_Z$, can have large errors and thereby introduce large transient system errors in the vertical position $P_Z$, and estimated vertical velocity 324. However, and as illustrated in chart 350, shown in FIG. 5, system 310 has a better initialization time and a better response time than system 200. Graph 350 includes an altitude output 352 over time and a corresponding vertical velocity output 354 which illustrates the response times of system 310 to changes in altitude. The vertical component of true airspeed 356 over time is also included in chart 350.

Figure 5:
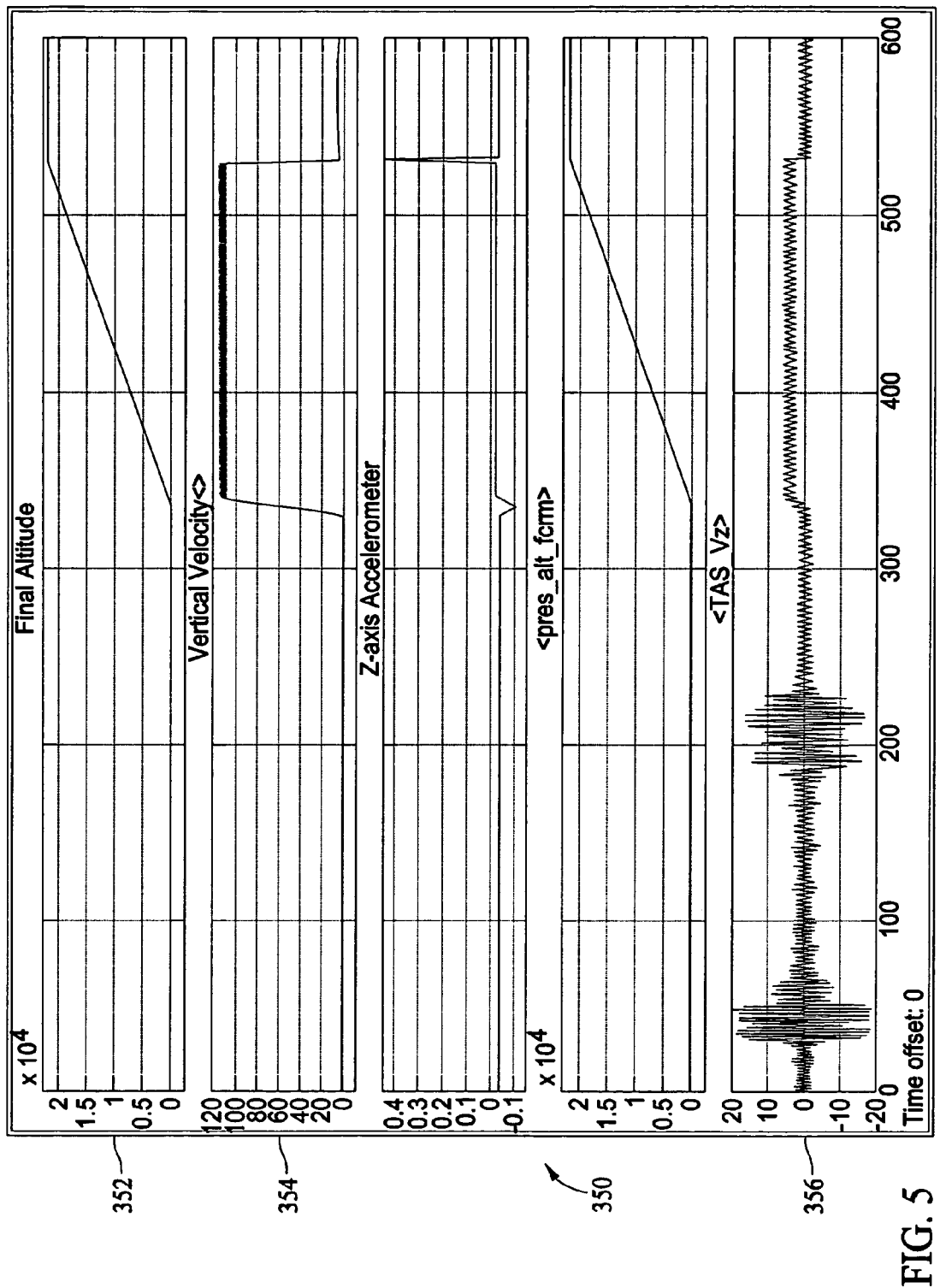
FIG. 5 is a graph illustrating vertical velocity response time for changes in altitude for the control system of FIG. 4.

The integration and transfer functions within system 310 have a shorter stabilization period and less overall error content, as shown in FIG. 5, as compared to system 200. Additionally, system 310 has a better response to the dynamics of flight over shorter time periods than does system 200. Further, the vertical component of velocity, $V_Z$, 336 is usable during high rates of climb, as illustrated in chart 350 by vertical velocity output 354.

In one embodiment, control system 310 (shown in FIG. 4) is implemented entirely by software in a computer. For example, and referring to inertial navigation system computer 20 (shown in FIG. 1), it should be recognized by those skilled in the art that control system 310, including true airspeed compensation unit 320, may be entirely incorporated into inertial navigation system computer 20. Alternatively, control system 310, including true airspeed compensation unit 320, may be implemented utilizing a wide variety of analog and digital circuits.

Further, the systems and methods described herein are applicable to both strapdown inertial navigation systems as well as gimbaled inertial navigation systems. As such, utilization of the vertical component of true airspeed to compensate an estimated vertical velocity based on roll and pitch data significantly improves the accuracy, stability and latency of a vertical velocity determination as compared to vertical velocity determinations which incorporate only barometric altimeter compensation for stabilization.

While the invention has been described in terms of various specific embodiments, those skilled in the art will recognize that the invention can be practiced with modification within the spirit and scope of the claims.

What is claimed is:

1. An inertial navigation system implementable in an aircraft, the system comprising:
   a first control system configured to estimate a vertical velocity based in part on received vertical acceleration data; and
   a second control system configured to receive the estimated vertical velocity from said first control system, said second control system configured to determine a compensated vertical velocity utilizing the estimated vertical velocity and a vertical component of airspeed, wherein said vertical component of airspeed is determined from a true airspeed signal generated by a true airspeed device, wherein the true airspeed signal is adjusted for attack and sideslip angles and aircraft attitude information to determine said vertical component of airspeed.

2. An inertial navigation system according to claim 1 wherein said first control system is further configured to utilize barometric altitude data to estimate vertical velocity.

3. An inertial navigation system according to claim 1 wherein said second control system derives an error signal for determining the compensated vertical velocity, the error signal derived from said vertical component of airspeed calculated from the true airspeed signal.

4. An inertial navigation system according to claim 3 wherein said second control system is configured to determine a difference between the vertical component of airspeed and the estimated vertical velocity.

5. An inertial navigation system according to claim 3 wherein said second control system comprises:
   a velocity summing unit comprising an output and configured to receive the estimated vertical velocity;
   a feedback summing unit configured to receive the vertical component of airspeed; and
   a gain unit configured to receive an output of said feedback summing unit, said gain unit comprising an output configured to be received by said velocity summing unit, said output of said velocity summing unit configured to provide the compensated vertical velocity.

6. An inertial navigation system according to claim 5 wherein the compensated vertical velocity is fed back into said feedback summing unit.

7. An inertial navigation system according to claim 5 comprising a navigation computer, said velocity summing unit, said feedback summing unit, and said gain unit incorporated within said navigation computer.

8. An inertial navigation system according to claim 5 comprising a navigation computer, said first control unit and said second control unit incorporated within said navigation computer.

9. A unit, implementable in an aircraft, for compensating an estimated vertical velocity with a vertical component of airspeed calculated from a true airspeed signal generated by a true airspeed device, said unit configured to calculate a vertical velocity by determining a difference between the vertical component of airspeed and the estimated vertical velocity, wherein the true airspeed signal is adjusted for attack and sideslip angles and aircraft attitude information to determine said vertical component of airspeed.

10. A unit according to claim 9 comprising:
    a velocity summing unit comprising an output and configured to receive the estimated vertical velocity;
    a feedback summing unit configured to receive the vertical component of airspeed; and
    a gain unit configured to receive an output of said feedback summing unit, said gain unit comprising an output configured to be received by said velocity summing unit, said output of said velocity summing unit configured to provide the compensated vertical velocity.

11. A unit according to claim 10 wherein the compensated vertical velocity is fed back to said feedback summing unit.

12. An inertial navigation system implementable in an aircraft, the system comprising:
    a true airspeed compensation unit receiving a vertical component of true airspeed and an estimated vertical velocity, the vertical component of true airspeed calculated from a true airspeed signal generated by a true airspeed device, wherein the true airspeed signal is adjusted for attack and sideslip angles and aircraft attitude information to determine the vertical component of true airspeed; and
    wherein the true airspeed compensation unit derives an error from the vertical component of true airspeed that adjusts the estimated vertical velocity to produce a vertical component of velocity signal.

13. The system of claim 12, wherein the aircraft attitude information includes roll and pitch.

14. The system of claim 1, wherein the aircraft attitude information includes roll and pitch.

15. The system of claim 9, wherein the aircraft attitude information includes roll and pitch.

* * * * *